United States Patent [19]
Hanson et al.

[11] Patent Number: 5,557,938
[45] Date of Patent: Sep. 24, 1996

[54] TRANSPORT REFRIGERATION UNIT AND METHOD OF OPERATING SAME

[75] Inventors: Jay L. Hanson, Bloomington; Doyle G. Herrig, Elko, both of Minn.

[73] Assignee: Thermo King Corporation, Minneapolis, Minn.

[21] Appl. No.: 395,014

[22] Filed: Feb. 27, 1995

[51] Int. Cl.$^6$ .................................................. F25B 49/02
[52] U.S. Cl. ........................ 62/126; 62/228.3; 62/228.4; 62/323.1; 62/239; 62/230
[58] Field of Search ............................ 62/125, 126, 127, 62/129, 133, 157, 231, 158, 239, 243, 228.1, 228.3, 228.4, 226, 227, 228.5, 229, 230, 323.1, 323.3, 323.4; 165/11.1, 41, 42, 43

[56] References Cited

U.S. PATENT DOCUMENTS

| | | | |
|---|---|---|---|
| 5,103,783 | 4/1992 | Hanson et al. | 123/198 |
| 5,140,826 | 8/1992 | Hanson et al. | 62/115 |
| 5,197,670 | 3/1993 | Hanson et al. | 235/78 |
| 5,201,186 | 4/1993 | Hanson | 62/126 |
| 5,222,368 | 6/1993 | Hanson | 62/126 |
| 5,454,229 | 10/1995 | Hanson et al. | 62/230 X |

*Primary Examiner*—Harry B. Tanner

[57] ABSTRACT

Methods and apparatus for extending engine operating time, with a given amount of fuel, of an internal combustion engine connected to drive a compressor of a transport refrigeration unit. A fuel level signal is provided in response to the amount of fuel in a fuel tank associated with the internal combustion engine. The operation of the transport refrigeration unit is modified in different predetermined ways at predetermined different values of the fuel level signal, as fuel is consumed, to reduce the rate at which engine fuel is used after each modification. The time that a space being conditioned by the transport refrigeration unit for a given fuel supply is thus extended, maintaining temperature control of the conditioned space over this extended time while sacrificing non-load threatening, incremental degrees of control precision.

32 Claims, 7 Drawing Sheets

| RAM MAP | — 236 |
|---|---|
| UNTL | |
| LNTL | |
| IF | |
| FL | |
| LFL | |
| ALARM CODE FCM | |
| BHSF | |
| SLMFS0 | |
| SLMF100 | |
| CMFF | |
| FCMF | |
| RNF | |
| NMF1 | |
| NMF2 | |

| RAM MAP | | — 238 |
|---|---|---|
| FUEL HISTORY | | — 249 |
| FUEL | DATE/TIME | |
| 1.0 | | |
| 0.9 | | |
| 0.8 | | |
| 0.7 | | |
| 0.6 | | |
| 0.5 | | |
| 0.4 | | |
| 0.3 | | |
| 1.0 | | |
| 0.9 | | |
| 0.2 | | |

| ROM MAP | — 234 |
|---|---|
| UNTL | |
| LNTL | |

TRANSPORT REFRIGERATION UNIT AND METHOD OF OPERATING SAME

TECHNICAL FIELD

The invention relates in general to transport refrigeration units, and more specifically to transport refrigeration units which are required to reliably operate for long periods of time without supervision.

BACKGROUND ART

U.S. Pat. Nos. 5,201,186 and 5,222,368, which are assigned to the same assignee as the present application, disclose methods for detecting conditions which may cause shut down of a refrigeration unit, such as a transport refrigeration unit. When such a condition is detected, steps are taken to modify the operation of the refrigeration unit in an attempt to find an operating condition which will prevent, or at least delay, mandatory shut down. When mandatory shut down is still found to be required, an alarm code is stored which identifies the cause of shut down, and an alarm is generated which notifies a person in charge of the refrigeration unit, such as the driver of a truck or tractor-trailer unit which the refrigeration unit is associated with.

Certain types of refrigeration units, however, are required to reliably operate for relatively long periods of time without an attendant, such as transport refrigeration units which are associated with containers carried by rail. Application Ser. No. 245,266, filed May 18, 1994, which is assigned to the same assignee as the present application, is directed to improvements in such rail carried transport refrigeration units. The improvements include monitoring a predetermined parameter of the refrigeration unit. The refrigeration unit is shut down in the event the monitored parameter reaches a mandatory shut down condition, and a shut down count is incremented. The predetermined parameter is monitored during the forced shut down, and when the predetermined monitored parameter has a value which permits restarting of the refrigeration unit, the refrigeration unit is restarted when the value of the shut down count is less than a predetermined value. When restarted, the operation of the refrigeration unit is modified, with the modification being selected to reduce the probability of the monitored parameter reaching the predetermined shut down condition. In one embodiment, the high pressure side of the refrigeration unit is monitored. A shut down and subsequent re-start due to high pressure is accompanied by a modification in the operation of the refrigeration unit to reduce the load on the compressor. In another embodiment, the compressor is driven by an internal combustion engine monitored by a temperature sensor. In the event of a shut down and re-start due to an over-temperature condition of the engine, the operation of the refrigeration unit is modified to reduce the load on the engine.

U.S. Pat. No. 5,197,670, which is assigned to the same assignee as the present invention, teaches a transport refrigeration unit operable in a cycle mode. Prime mover re-start temperatures which define upper and lower limits of the off cycle or "null" band, are dynamically changed in response to a relationship between the temperature of a space being conditioned and ambient temperature.

An object of the present invention is to provide apparatus and methods which improve the reliability of transport refrigeration units having internal combustion engines as prime movers. Another object of the invention is to reduce the incidence of shut-downs of engine driven transport refrigeration units which operate unattended for long periods of time, such as the hereinbefore mentioned container units which are carried by rail, due to running out of engine fuel.

SUMMARY OF THE INVENTION

Briefly, the present invention includes methods and apparatus which enable an engine driven transport refrigeration unit to operate longer without running out of fuel, by modifying the operation of the transport refrigeration unit at predetermined fuel levels to conserve fuel. In both the methods and apparatus, a transport refrigeration unit is associated with a conditioned space to be temperature controlled, with the transport refrigeration unit including a refrigerant compressor driven by an internal combustion engine having fuel in a fuel supply tank.

The method includes providing a fuel level signal responsive to the amount of fuel in the fuel supply tank, and modifying the operation of the transport refrigeration unit in response to a predetermined value of the fuel level signal. The modifying step increases the length of time the transport refrigeration unit will function to control the temperature of the conditioned space without exhausting the fuel in the fuel supply tank.

The apparatus includes first means providing a fuel level signal responsive to the amount of fuel in the fuel supply tank, and second means modifying the operation of the transport refrigeration unit in response to a predetermined value of the fuel level signal provided by said first means. The second means increases the length of time the transport refrigeration unit will function to control the temperature of the conditioned space without exhausting the fuel in the fuel supply tank.

Desirable embodiments of the method and apparatus include providing an alarm when the operation of the transport refrigeration unit is modified in response to the predetermined value of the fuel level signal, and maintaining a fuel history. Maintaining a fuel history includes recording the value of the fuel level signal at predetermined increments thereof, and time stamping each recording of the fuel level signal.

Embodiments of the method and apparatus related to how the operation of the transport refrigeration unit is modified to conserve fuel at predetermined different values of a fuel level signal include blocking operation of the engine at the higher of two operating speeds, regardless of whether the transport refrigeration unit is operating in a continuous mode, or a start-stop cycle mode.

Embodiments of the method and apparatus related to how the operation of the transport refrigeration unit is modified to conserve fuel when the transport refrigeration unit is operating in the continuous mode include forcing the transport refrigeration unit to operate with suction line modulation, with different fuel levels forcing different degrees of suction line modulation; and forcing the transport refrigeration unit to operate in the start-stop cycle mode, notwithstanding the selection of the continuous mode. When the transport refrigeration unit is forced to operate in the start-start cycle mode, the normal limits of the "null" zone are expanded to provide a longer engine off time, and run and null time limits are imposed, to provide a maximum run time limit and a minimum null time limit.

Embodiments of the method and apparatus related to how the operation of the transport refrigeration unit is modified to conserve fuel when the transport refrigeration unit is operating in the start-stop cycle mode include expanding the size of the "null" zone in steps as the fuel supply is diminished, and providing run and null time limits, ie., a maximum "run" time and a minimum "null" time.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
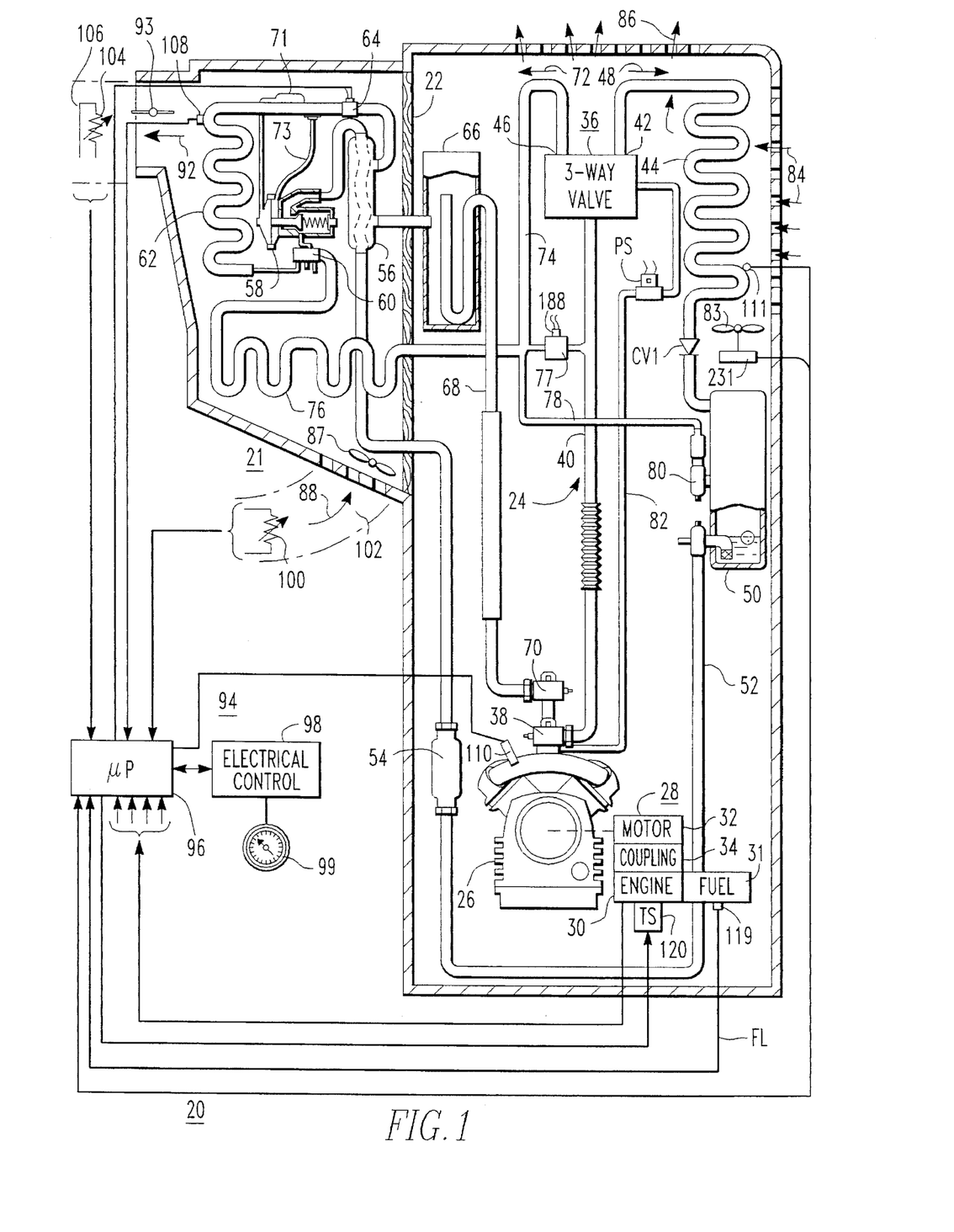
FIG. 1 is a schematic piping and wiring diagram of a refrigeration unit which may be operated according to the teachings of the invention.

Referring now to the drawing, and to FIG. 1 in particular, there is shown a transport refrigeration unit 20 which may utilize the methods of the invention. Transport refrigeration unit 20 controls the temperature of a conditioned space 21 to a predetermined temperature range adjacent to a selected set point temperature. Transport refrigeration unit 20, for example, may be mounted on a container, truck, or trailer, such as on a wall 22 thereof. Transport refrigeration unit 20 has a closed fluid refrigerant flow path 24 which includes a refrigerant compressor 26 driven by a prime mover arrangement 28.

Prime mover arrangement 28 includes an internal combustion engine 30, such as a diesel engine, having a fuel supply or fuel tank 31. Prime mover arrangement 28 may optionally include a stand-by electric motor 32. Engine 30 and motor 32, when both are utilized, are coupled to compressor 26 by a suitable clutch or coupling 34 which disengages engine 30 while motor 32 is operative. Engine 30 is selectively operable at one of at least first and second operating speeds, called high and low speed, respectively, which, for example, may be 2200 RPM and 1400 RPM. The speed selection is normally made in response to a temperature control algorithm, as will be hereinafter described.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first outlet port 42, which is selected to initiate a cooling cycle. The first outlet port 42 is connected to the inlet side of a condenser coil 44. Three-way valve 36 has a second outlet port 46, which is selected to initiate a heating cycle.

When three-way valve 36 selects the cooling cycle outlet port 42, it connects compressor 26 in a first refrigerant flow path 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, a controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and a pressure equalizer line 73.

When three-way valve 36 selects the heating cycle output port 46, it connects compressor 26 in a second refrigerant flow path 72. The second refrigerant flow path 72 by-passes condenser coil 44 and expansion valve 58, connecting the hot gas output of compressor 26 to the refrigerant distributor 60 via a hot gas line 74 and a defrost pan heater 76. A hot gas by-pass solenoid valve 77 may optionally be disposed between hot gas line 40 and hot gas line 74 to controllably inject hot refrigerant gas into hot gas line 74 during a cooling cycle. A by-pass or pressurizing line 78 connects hot gas line 74 to receiver 50 via by-pass and check valves 80, to force refrigerant from refrigerant receiver 50 into an active refrigerant flow path during heating and defrost cycles.

A conduit or line 82 connects three-way valve 36 to the low pressure side of compressor 26 via a normally closed pilot solenoid valve PS. When solenoid valve PS is de-energized and thus closed, three-way valve 18 is spring biased to select the cooling cycle output port 42. When evaporator 62 requires defrosting, and when the conditioned space 21 requires heat to maintain a selected set point temperature, pilot solenoid valve PS is energized to cause the low pressure side of compressor 26 to operate three-way valve 36 to select the heating cycle output port 46 to initiate a heating cycle or a defrost cycle.

A condenser fan or blower 83, which has selectable low and high operating speeds, causes ambient air 84 to flow through condenser coil 44, with the resulting heated air 86 being discharged to the atmosphere. An evaporator fan or blower 87 draws air 88, called "return air" from conditioned space 21, through the evaporator coil 62, and the resulting cooled or heated air 92, called "discharge air" is returned to conditioned space 21. During an evaporator defrost cycle a defrost air damper 93 may be operated to close the discharge air path to the conditioned space 90.

Transport refrigeration unit 20 is controlled by electrical control 94 which includes a microprocessor based controller 96 and electrical control circuits and components 98. Electrical control circuits and components 98 include relays, solenoids, and the like, and will be explained relative to FIGS. 2A and 2B. Controller 96 receives input signals from a plurality of devices, including inputs from: a set point temperature selector 99 which may be manually actuated to select the desired temperature of conditioned space 21; a return air temperature sensor 100 disposed in a suitable return air path 102; a discharge air temperature sensor 104 disposed in a suitable discharge air path 106; a coil temperature sensor and switch 108 disposed to sense the temperature of the evaporator coil 62; from a refrigerant pressure sensor or high pressure cut out (HPCO) 110 disposed on the high pressure side of the refrigerant flow path 48; and from a condenser coil temperature sensor 111. The high pressure side of refrigeration unit 20 extends from the discharge side of compressor 26 to expansion valve 58, and thus, for example, pressure sensor 110 may be disposed on a discharge manifold of compressor 26, as illustrated. The low pressure side of refrigeration unit 20 extends from evaporator coil 62 to the suction side of compressor 26.

Figure 2A:
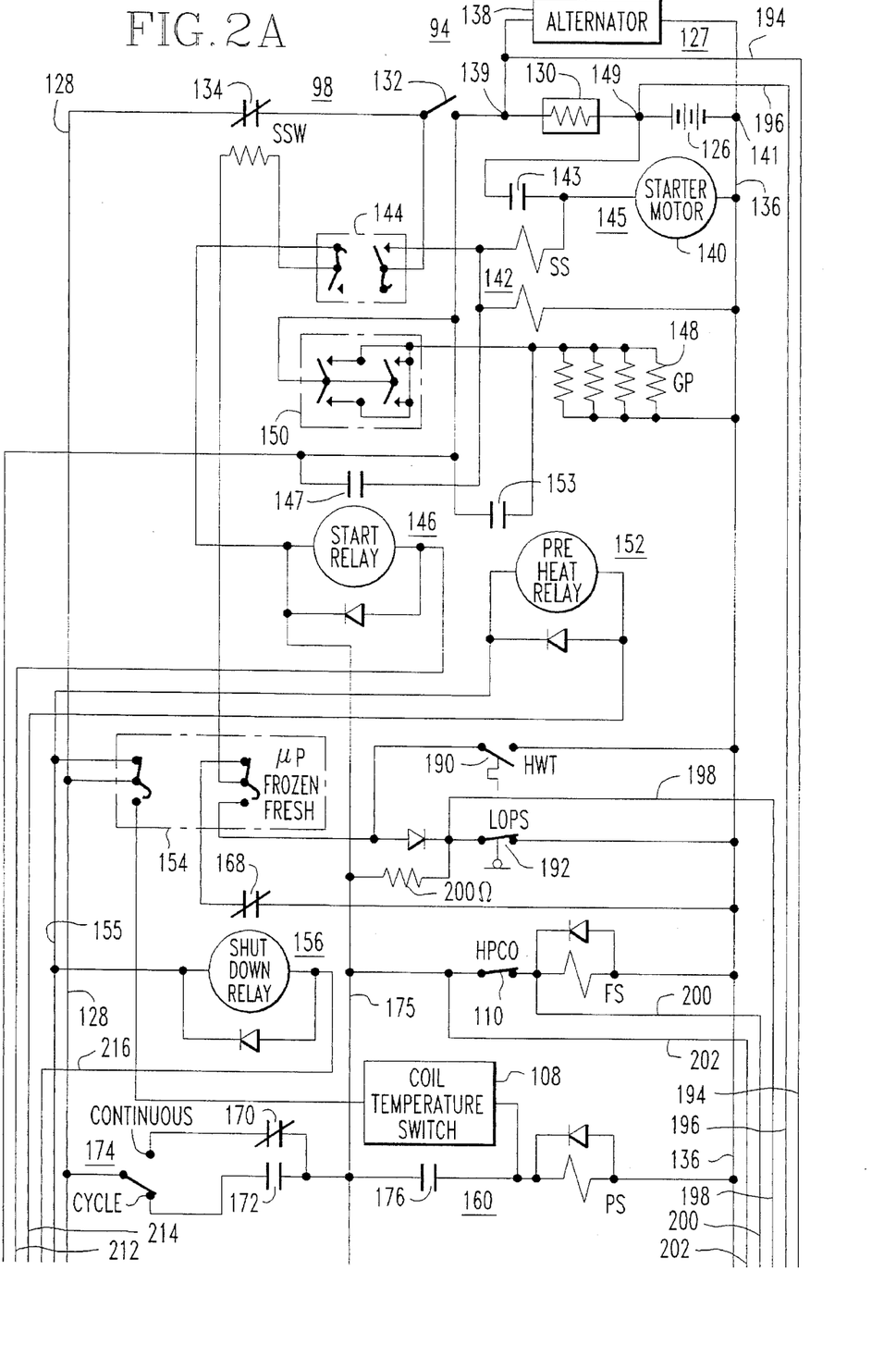
FIGS. 2A and 2B, when assembled, provide a detailed schematic diagram of electrical control shown in block form in FIG. 1.
Figure 2B:
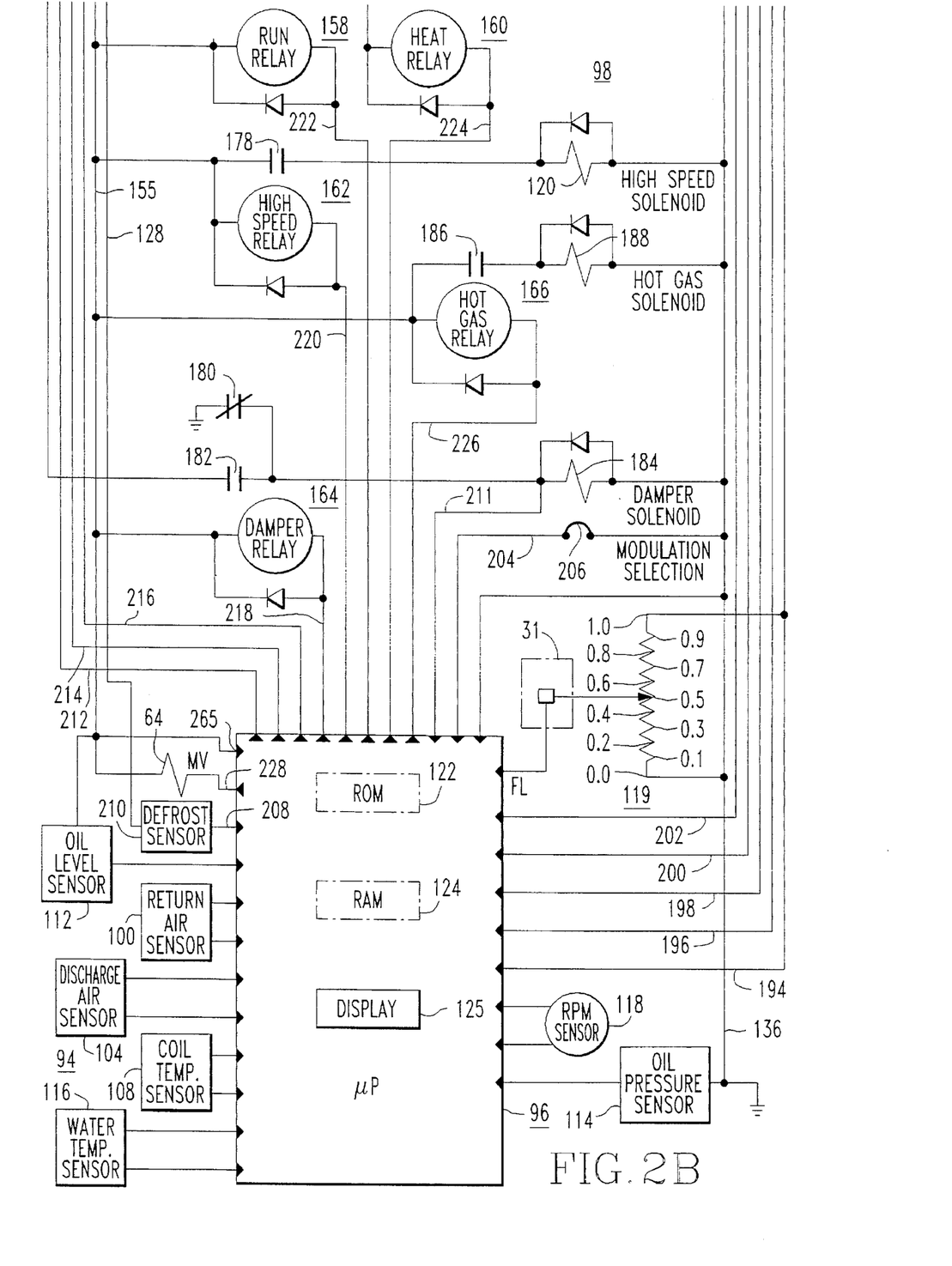

FIGS. 2A and 2B, when assembled, provide a detailed schematic diagram of electrical control 94, which includes controller 96 and electrical control 98. Electrical control 94 receives inputs from various engine sensors, such as engine coolant level sensor 112, oil pressure sensor 114, engine coolant temperature sensor 116, and engine speed or RPM sensor 118.

In accordance with the teachings of the invention, electrical control 94 also receives a signal FL from a fuel level sensor 119 which senses the level of engine fuel in fuel tank 31.

Controller 96, among other things, controls hot gas valve 77, a throttle or high speed solenoid 120 which selects the hereinbefore mentioned high and low operating speeds of engine 30, and the magnitude of current flow through a control coil associated with modulation valve 64.

Controller 96 includes a read-only memory (ROM) 122 for storing programs to be hereinafter described, and a random-access memory (RAM) 124 for software timers, program flags, input signals, output signals, and other program variables generated by the operating programs. Controller 96 also includes a display 125 for displaying alarm or fault codes, for flashing an alarm icon or indicator, for displaying system status via status lights, and the like, such as described in U.S. Pat. No. 5,123,251, which is assigned to the same assignee as the present application.

Electrical control circuits and components 98 include a source of potential or power supply 127 having first and second conductors 128 and 136, respectively. Power supply 127 includes a battery 126 which has one side connected to the first power supply conductor 128 via a DC current measuring shunt 130 which measures battery charge and discharge current. Control 98 further includes an on-off switch 132, and normally closed contacts 134 of a protective reset switch SSW. The remaining side of battery 126 is connected to the second power supply conductor 136, which is grounded. Power supply 127 further includes a generator or alternator 138 driven by prime mover arrangement 28, with the generator or alternator 138 being connected from a junction point 139 between switch 132 and current shunt 130 to a junction point 141 on grounded conductor 136. Junction points 139 and 141 form output terminals of power supply 127 which provide a voltage and current to the circuits and components connected thereto.

Control 98 also includes engine starting apparatus 145 for engine 30, with engine starting apparatus 145 having a portion which is connected directly to battery 126, eg., to a junction point 149 between battery shunt 130 and battery 126, and a portion which is connected to power supply output terminal 139. The portion of engine starting apparatus 145 which is connected to junction point 149 includes a starter motor 140 which is controlled by a starter solenoid 142 having associated normally open contacts 143, an ignition switch 144, and a start relay 146 having associated normally open contacts 147. The portion of starting apparatus 145 which is connected to power supply output terminal 139, to enable current draw to be measured by the battery shunt 130, includes engine pre-heat control, including glow plug resistors (GP) 148, a pre-heat switch 150 and normally open contacts 153 of a pre-heat relay 152.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places transport refrigeration unit 20 under control of controller 96. The upper position provides voltage from power supply conductor 128 to a conductor 155. An intermediate position of switch 154, in which the center terminal is not connected to either the upper terminal or the lower terminal, is selected when controller 96 is not utilized and the load in the conditioned space 21 is frozen. This switch position will cause unit 20 to operate continuously in a low speed cool mode LSC. The lower position of switch 154 is selected when controller 96 is not utilized and the load in conditioned space 21 is non-frozen. This position of switch 154 will cause unit 20 to operate continuously, switching between heating and cooling cycles under the control of the hereinbefore mentioned evaporator coil temperature sensor and switch 108. Evaporator coil temperature sensor and switch 108 is preset to close at a predetermined coil temperature, such as 35 degrees F. (1.7° C.) to energize the pilot solenoid PS and initiate a heating cycle, and to open at a predetermined higher temperature, such as 38 degrees F. (3.3° C.) to de-energize pilot solenoid PS and initiate a cooling cycle.

In addition to the control devices or relays already mentioned, control 98 includes control devices in the form of a shutdown relay 156, a run relay 158, a heat relay 160, a high speed relay 162, a defrost damper relay 164, and a hot gas relay 166. Shutdown relay 156 is normally energized, and is de-energized to shut transport refrigeration unit 20 down via its associated set of normally-closed contacts 168 which ground the protective switch SSW and cause it to open its contacts 134. Run relay 158 has normally open contacts 172 connected to an operating mode selector switch 174 which has an input connected to conductor 128. Selector switch 174 selects either: (1) a continuous operating mode in which a prime mover of arrangement 28 operates continuously; or, (2) a cycling start-stop operating mode, which includes starting and-stopping a prime mover of the prime mover arrangement 28.

Contacts 172 of run relay 158 provide voltage to a conductor 175 from conductor 128 and mode selector switch 174. Run relay 158 must be energized to enable the starting and running of refrigeration unit 20 via internal combustion engine 30.

Heat relay 160 has a set of normally open contacts 176 for controlling the pilot solenoid PS. High speed relay 162 has a set of normally open contacts 178 for controlling the high speed solenoid 120. Damper relay 164 has a set of normally closed contacts 180 and a set of normally open contacts 182, connected to control a defrost damper solenoid 184 which is linked to defrost damper 93. Hot gas relay 166 is provided for controlling the hot gas valve 77 via a set of normally open contacts 186 and a hot gas solenoid coil 188.

Control 98 also includes an engine coolant temperature switch (HWT) 190, which closes when the engine coolant reaches a predetermined elevated temperature, and a low oil pressure switch (LOPS) 192 which is open as long as engine oil pressure is normal. The closing of either switch 190 or 192 will shut unit 20 down via the manual reset switch SSW.

Controller 96 senses the voltage across the battery shunt 130 via conductors 194 and 196, and can thus determine the magnitude and polarity of battery current. One polarity, which will be called positive, indicates the battery 126 is being charged by alternator 138, and also indicates a compressor prime mover of prime mover arrangement 28 is running. The other polarity, ie., negative, indicates battery 126 is discharging.

Controller 96 also has a conductor 198 which senses the position of the low oil pressure switch 192, conductors 200 and 202 which sense the voltage level on first and second sides, respectively, of the high refrigerant pressure cut-out switch 110, a conductor 204 which senses whether or not a suction line modulation valve selector jumper 206 has connected conductor 204 to system ground 136, a conductor 208 which senses whether or not a defrost sensor switch 210 has operated, signifying the need for a defrost cycle, and a conductor 211 which detects voltage on the damper solenoid 184.

Controller 96 has a plurality of output conductors or drive lines for controlling the energization and de-energization of a plurality of control devices, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in a control coil associated with suction line modulation valve 64.

As the various functions performed by controller 96 are described, only those necessary for understanding the invention will be described in detail. Reference may be had to U.S. Pat. Nos. 5,123,252; 5,123,253; 5,140,825; and 5,140,826, which are assigned to the same assignee as the present application, for details relative to functions shown in block form.

Figure 3A:
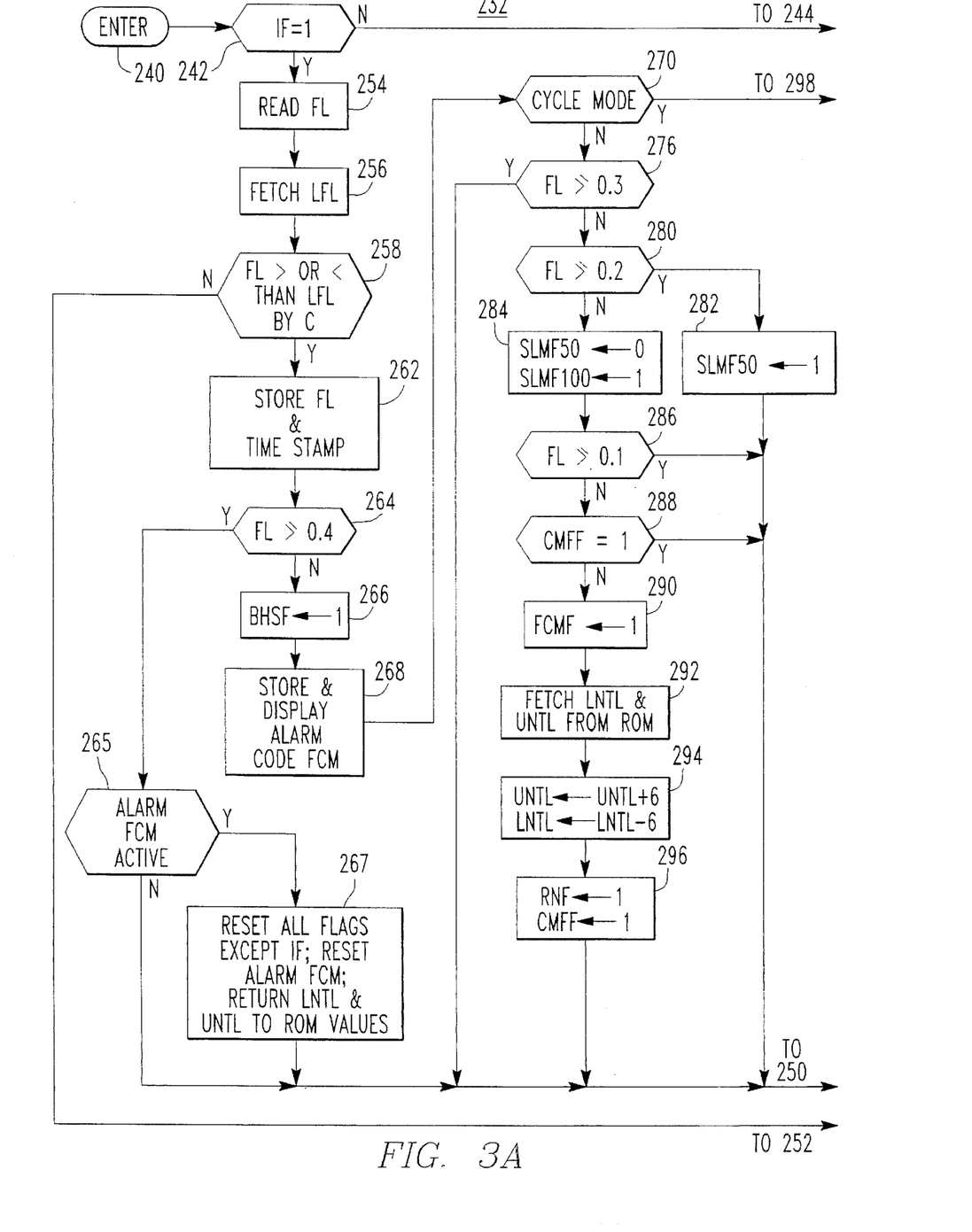
FIGS. 3A and 3B, when assembled, provide a detailed flow diagram which implements certain teachings the invention.
Figure 3B:
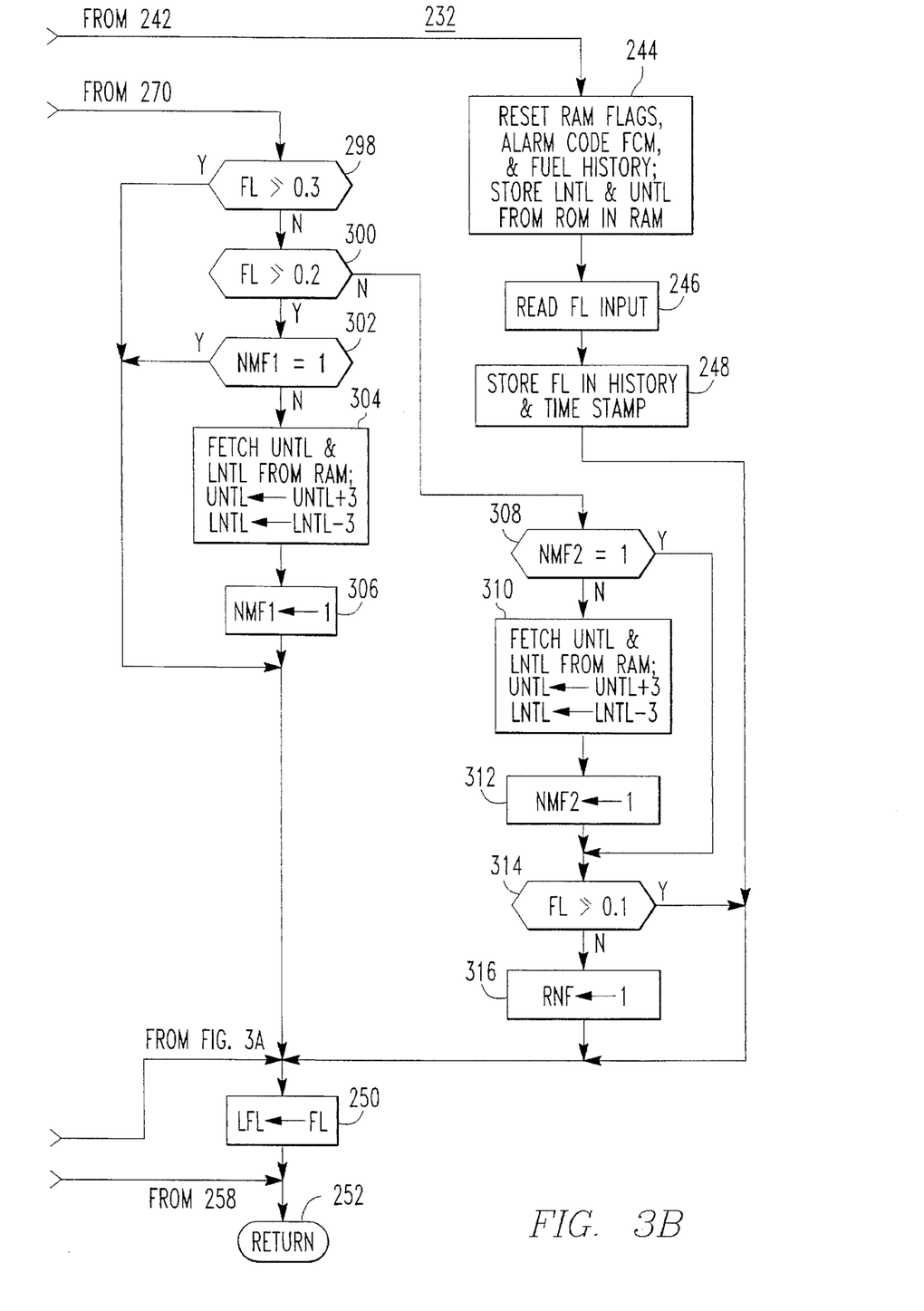

FIGS. 3A and 3B set forth a flow diagram of an application program 232 which, along with certain of the components hereinbefore described, implements the teachings of the invention. During the description of FIGS. 3A and 3B, FIGS. 4, 5 and 6 will be referred to, with FIG. 4 illustrating a ROM map 234 stored in ROM 122, FIG. 5 being a RAM map 236 stored in RAM 124, and FIG. 6 being a RAM map 238 stored in RAM 124, or optionally in a non-volatile memory.

Program 232 is entered periodically at 240 in FIG. 3A and step 242 checks a initialization flag IF to determine if this is a start of a new trip for transport refrigeration unit 20. Initialization flag IF is reset to zero during normal pre-trip procedures. Upon finding IF reset, step 242 proceeds to step 244 in FIG. 3B which performs certain initialization procedures, including resetting program flags in RAM 124, such as the flags shown in the RAM map 236 of FIG. 5. Step 244 also resets an alarm code FCM, which, when set, indicates that transport refrigeration unit 20 is operating in a fuel conservation mode.

Figure 4:
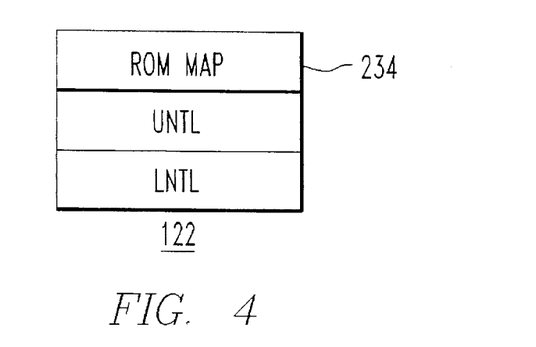
FIG. 4 is a ROM map which is referred to during the description of the flow diagram of FIGS. 3A and 3B.
Figure 5:
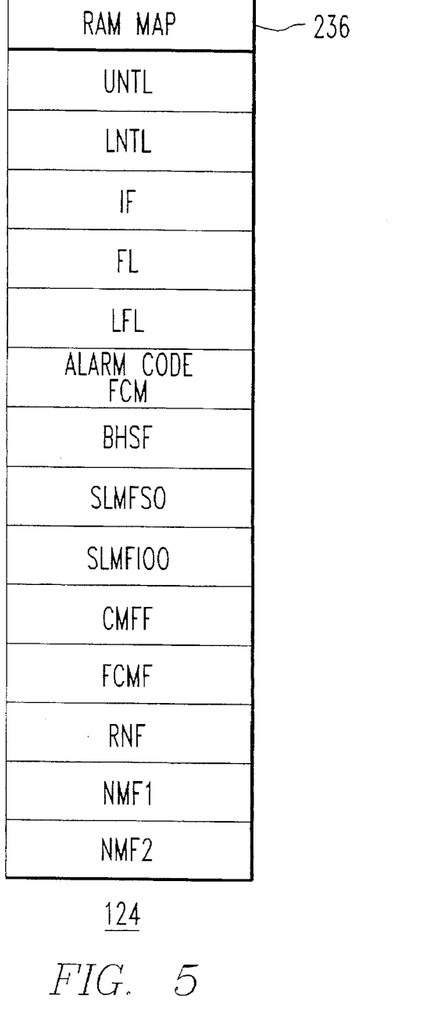
FIG. 5 is a RAM map listing flags, an alarm code, and other program variables, utilized during the running of the application program shown in FIGS. 3A and 3B.

Step 244 also fetches default values LNTL and UNTL from ROM 122, as shown in ROM map 234 in FIG. 4, and stores these constants in RAM 124, as shown in RAM map 236 in FIG. 5. Values LNTL and UNTL establish lower and upper temperature limits, respectively, of a "null" zone utilized when transport refrigeration unit 20 is operating in a start-stop cycle mode, as opposed to a continuous mode.

Engine 30 is off when the temperature of conditioned space 21 is within the limits of the "null" zone. Value LNTL is a temperature below the set point temperature SP at which engine 30 is re-started upon a falling temperature in conditioned space 21, and value UNTL is a temperature above SP at which engine 30 is re-started upon a rising temperature in conditioned space 21.

Step 244 then proceeds to step 246 which reads fuel level signal FL provided by an input to microprocessor based controller 96 from fuel level sensor 119 associated with fuel supply tank 31, as shown in FIG. 2B. For purposes of example, it will be assumed that fuel level signal FL indicates the amount of fuel in fuel supply tank 31 in tenths. The maximum signal of 1.0 indicates a full tank, a signal of 0.5 indicates tank 31 is half full, and 0.0 indicates tank 31 is empty. Step 246 stores fuel level signal FL in RAM 124, as illustrated in RAM map 236 of FIG. 5.

Figure 6:
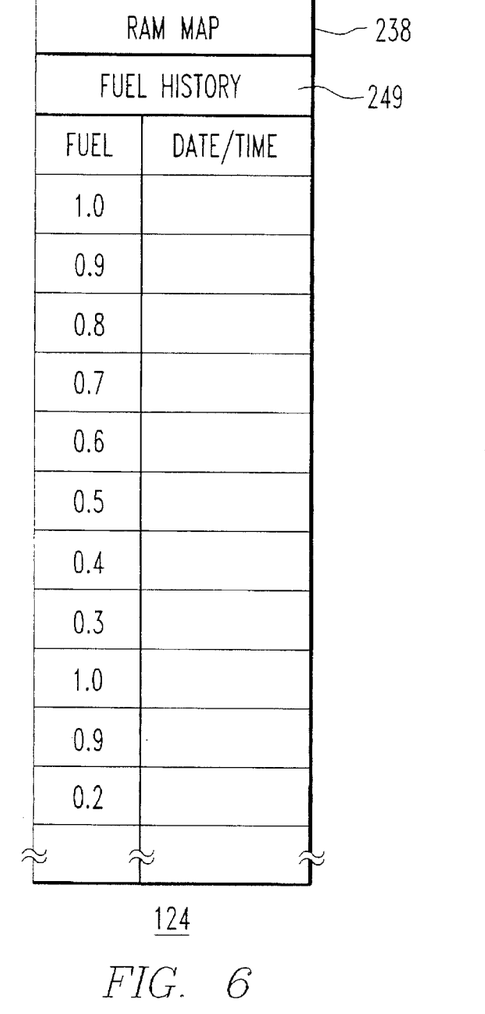
FIG. 6 is a RAM map illustrating a fuel history which is maintained by the program shown in FIGS. 3A and 3B during each new trip of the transport refrigeration unit shown in FIG. 1.

Step 246 then advances to step 248 which stores signal FL in a fuel history tabulation 249 shown in RAM map 238 of FIG. 6. Fuel history tabulation 249 may be stored in RAM 124, or optionally in another RAM, which may be non-volatile. Each storing of signal FL is time stamped, such as with the day, month, year, and time of day.

Fuel history tabulation 249 is a valuable tool for the owner of the transport refrigeration unit 20, as on trips during which transport refrigeration unit 20 is unattended, such as during a leg of a trip which includes rail, the owner depends upon contract personnel to re-fuel the unit and accurately charge for fuel added. In addition to accurately indicating how much fuel was added during re-fueling, fuel history tabulation 249 will also record when the fuel level drops quickly over a short period of time, possibly indicating wrongful removal of fuel from fuel supply tank 31. Opportunity for such theft occurs, for example, when transport refrigeration unit 20 is removed from one train and placed on another.

Step 248 advances to step 250, with step 250 additionally storing fuel level signal FL in RAM 124 as value LFL. Value LFL, is thus the "last reading" of the fuel level signal FL, which is compared with each new reading FL, as will be hereinafter described. Program 232 then returns to an executive program at point 252.

Upon the next running of program 232, step 242 will now find initialization flag IF is set, and step 242 branches to step 254 which reads fuel level signal FL. Step 256 fetches value LFL, the last reading of signal FL, and step 258 compares signal FL with value LFL. If FL hasn't changed from value LFL by more than a predetermined constant value C, such as one-tenth in a desirable embodiment of the invention, step 258 proceeds to program return point 252, without storing this latest reading of FL. A change of one-tenth, or other suitable value, will prevent fuel history tabulation 249 from becoming unnecessarily lengthy and wasteful of memory space.

When step 258 finds that the fuel level has changed by the predetermined amount, eg., to a new one-tenth level, step 258 branches to step 262 which stores the value of signal FL in fuel history tabulation 249 and time stamps it.

Signal FL is also stored in RAM 124 for later use during this running of program 232, with the next step 264 comparing signal FL with a predetermined constant value, such as 0.4, for example. The predetermined constant used in step 264 is chosen to be the value of signal FL at which it is desired that fuel conservation modifications to the operation of transport refrigeration unit be initiated. If unit 20 should normally be re-fueled before signal FL drops to 0.4, for example, then a fuel level signal FL of 0.4 is a good choice to start fuel conservation measures.

When step 264 finds that signal FL is equal to, or greater than 0.4, step 265 determines if alarm FCM is active. If alarm FCM is not active, step 265 proceeds to the hereinbefore described step 250 in FIG. 3B, to replace the value LFL with the latest reading of FL, and program 232 exits at 252.

When step 265 finds that alarm FCM is active, it indicates that while fuel conservation modifications in the operation of transport refrigeration unit 20 have been initiated, they are no longer necessary due to re-fueling. Step 265 then branches to step 267 which performs a re-initialization procedure which takes care of re-fueling activities which occur after fuel conservation procedures have been initiated. For example, step 267 resets all program flags, except the initialization flag IF, which may have been set during the fuel conservation procedures. Step 265 also resets alarm FCM, and it returns any modification of the "null" zone limits LNTL and UNTL initiated during the fuel conservation procedures back to the default values stored in ROM 122. Step 267 then proceeds to step 250 in FIG. 3B.

When step 264 finds that fuel level signal FL is less than 0.4, the fuel level has been reached at which a first fuel saving modification is made to the operation of transport refrigeration unit 20. As hereinbefore described, a predetermined temperature control algorithm controls the operation of transport refrigeration unit 20, with the temperature control algorithm indicating whether engine 30 should be operating in high speed or in low speed, as selected by throttle or high speed solenoid 120 in FIGS. 1 and 2B. The first fuel saving modification, initiated when fuel level signal FL drops below 0.4, blocks operation of engine 30 at high speed by setting a "block high speed" flag BHSF in step 266. When the applicable temperature control algorithm calls for high speed operation of engine 30, controller 96 checks flag BHSF before initiating high speed. If engine 30 is operating at high speed when flag BHSF is set, controller 96 de-energizes high speed solenoid 120 to drop the speed to the low speed set point.

Step 268 then sets and stores fuel conservation alarm FCM, and step 268 also illuminates an alarm indicator on display 125 shown in FIG. 2B. The resetting of alarm FCM in the hereinbefore described step 267 de-energizes the visual indicator on display 125, but the logging of alarm FCM is retained in a certain portion of RAM 124 for later use by authorized personnel.

Step 268 then proceeds to step 270 which checks the position of selector switch 174 in FIG. 2A to determine the selected operating mode of transport refrigeration unit 20, as the remaining incremental operational changes in unit 20 to conserve fuel are dependent upon the selected operating mode. One position of selector switch 174 selects a continuous operating mode, in which engine 30 is operated continuously, and another position of selector switch 174 selects a start-stop cycle mode in which engine 30 is off while the temperature of conditioned space 21 is within a predetermined "null" temperature zone defined by the values of the hereinbefore mentioned values LNTL and UNTL.

Figure 7:
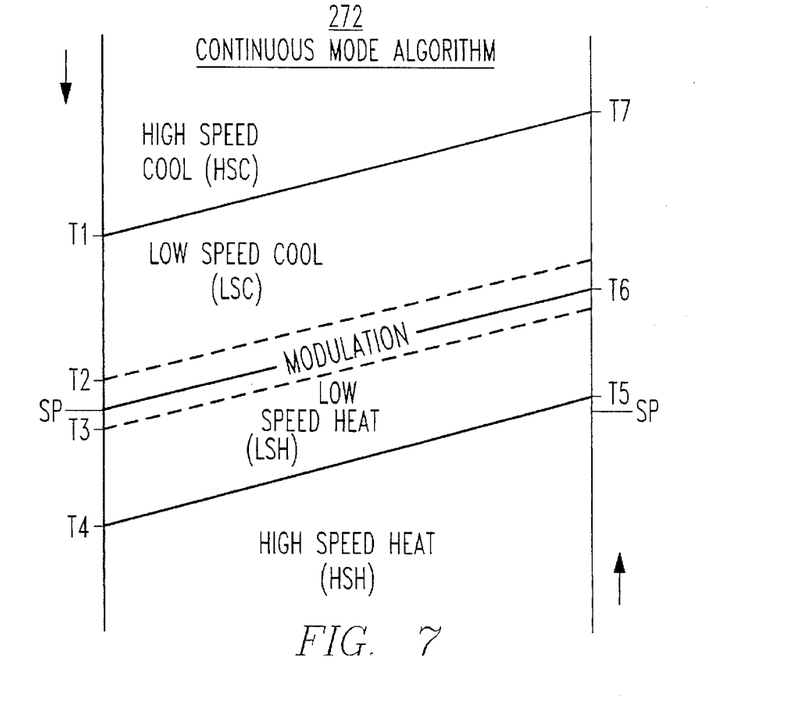
FIG. 7 is a temperature control algorithm which may be used when a continuous operating mode for the transport refrigeration unit shown in FIG. 1 is selected.

FIG. 7 illustrates an exemplary continuous mode algorithm 272 which may control the operation of controller 96 when selector switch 174 selects the continuous operating mode. The left-hand side of algorithm 272 indicates operational changes made with a falling temperature in conditioned space 21, and the right-hand side indicates operational changes made with a rising temperature in conditioned space 21. For example, during initial temperature pull down, engine 30 is operated at high speed and transport refrigeration unit is operated in a high speed cooling mode HSC until the temperature of conditioned space 21 reaches a predetermined temperature T1 above the selected set point temperature SP. High speed solenoid 120 is then de-energized and engine 30 drops to the low speed setting and unit 20 operates in a low speed cool mode LSC.

When the temperature of conditioned space 21 drops to a predetermined value T2 above set point SP, if jumper 206 is in place, suction line modulation valve 64 is closed to a predetermined degree to initiate a predetermined degree of suction line modulation. At set point SP pilot solenoid valve PS shown in FIG. 2A is energized to initiate a low speed heat mode LSH. Suction line modulation may be maintained until the temperature of conditioned space drops to a predetermined temperature T3 below set point SP. Should the temperature of conditioned space 21 continue to drop and reach a value T4, high speed solenoid 120 is energized to place unit 20 in a high speed heat mode HSH. The recited mode switching sequence is reversed with a rising temperature in conditioned space 21, with different temperature values being used to initiate the modes during a rising temperature than used during a falling temperature, to provide hysteresis and prevent rapid back and forth mode shifts once a mode trigger point has been reached.

Figure 8:
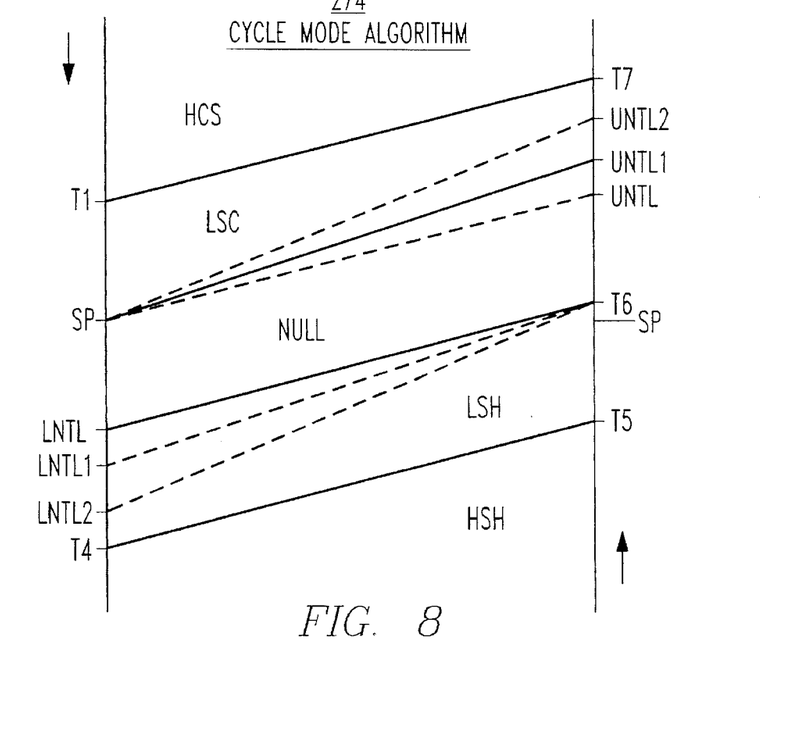
FIG. 8 is a temperature control algorithm which may be used when a cycle operating mode for the transport refrigeration unit shown in FIG. 1 is selected.

FIG. 8 illustrates an exemplary cycle mode algorithm 274 which may be used to control controller 96 when selector switch 174 selects the cycle mode. Unit 20 is operated in the high speed cool mode HSC during temperature pull down of conditioned space 21, switching to low speed cool LSC at temperature T1. When the temperature of conditioned space drops to set point SP engine 30 is stopped and unit 20 is in a NULL operating mode. Should the temperature of conditioned space 21 drop to the lower null temperature limit LNTL, engine 30 is restarted in low speed and unit 20 operates in the low speed heat mode LSH. A further drop in temperature to temperature T4 energizes high speed solenoid 120 and unit 20 operates in the high speed heat mode HSH.

With a rising temperature in conditioned space 21, unit 20 switches from HSH to LSH at temperature T5, engine 30 is turned off at T6, and if the temperature in conditioned space 21 rises to the upper limit UNTL of the NULL operating mode, engine 30 is restarted to initiate the low speed cool mode LSC. A continued rise in the temperature of conditioned space to T7 initiates the high speed cool mode HSC.

When selector switch 174 has been set to the continuous operating mode, step 270 goes to step 276 which compares fuel level signal FL with a value such as 0.3. Step 264 found FL to be less than 0.4. If step 276 finds FL to be equal to, or greater than 0.3, no further modification is made in the operation of unit 20, and step 276 proceeds to step 250 in FIG. 3B.

Should the fuel level in fuel supply tank 31 fall to a value below 0.3, step 276 branches to a step 280 which determines if the fuel level signal FL is above or below another predetermined value, such as 0.2. If signal FL is equal to or greater than 0.2, step 280 proceeds to step 282 which sets a flag SLMF50. When controller 96 finds flag SLMF50 set, controller 96 initiates a current flow in the control coil of suction line modulation valve 64 which selects a predetermined percent suction line modulation, such as 50 percent. Suction line modulation is initiated regardless of whether suction line modulation is used in the applicable temperature control algorithm, and regardless of whether or not the suction line selection jumper 206 is in place. Suction line modulation of 50 percent typically results in a 10 percent reduction in the rate of fuel consumption. Step 282 proceeds to step 250 in FIG. 3B.

Should the fuel level in fuel supply tank 31 drop to 0.2, or below, step 280 resets flag SLMF50 and it sets a flag SLMF100 which, when set, causes controller 96 to increase suction line modulation to 100 percent. Suction line modulation of 100 percent typically reduces the fuel consumption rate by 30 percent.

Step 284 then proceeds to step 286 which determines if signal FL is above or below a value of 0.1. When signal FL equals or exceeds 0.1, step 286 proceeds to step 250 in FIG. 3B. When step 286 finds that signal FL has dropped below a value of 0.1, step 288 checks a flag CMFF to determine if unit 20 has been forced to switch to cycle mode. At this point in program 232, unit 20 will still be in the selected continuous operating mode and flag CMFF will be found to be reset. Step 288 advances to step 290 which sets a "forced cycle mode" flag FCMF. When flag FCMF is set, controller 96 switches the operation of unit 20 to cycle mode, and uses algorithm 274 instead of algorithm 272.

In addition to forcing unit 20 to operate in the cycle mode, even though selector switch 174 is positioned to select the continuous mode, the normal cycle mode is further modified to reduce fuel consumption, by stretching the limits of the NULL zone, and by placing a limit on the maximum time engine 30 is allowed to run after a re-start, and on the minimum time engine 30 can be off before being re-started. These modifications to cycle operation are made by steps 292, 294 and 296. Step 292 fetches the null zone default limits LNTL and UNTL from ROM 122, and step 294 modifies each limit by adding a predetermined constant, such as 6 to the upper temperature limit UNTL, and by subtracting a predetermined constant, such as 6, from the lower temperature limit LNTL. Such a modification to the lower null zone limit will lower the engine re-start temperature from LNTL to LNTL2 during a falling temperature in conditioned space 21, as shown in FIG. 8, and it will raise the engine re-start temperature during a rising temperature in conditioned space from UNTL to UNTL2.

Step 294 then proceeds to step 296 which sets flags RNF and CMFF. When flag RNF is set it places the hereinbefore mentioned limits or engine run time after a re-start, and engine off time after a stop. For example, when flag RNF is set, controller 96 will not allow engine 30 to run more than 15 minutes after each re-start, and controller 96 will not allow engine 30 to re-start for 30 minutes after a stop. Of course, if the applicable temperature control algorithm calls for stopping engine 30 before the maximum running time of 15 minutes has been reached, the engine will be stopped, and in like manner if the temperature control algorithm finds that an engine re-start is not necessary during the 30 minute minimum off time, the actual re-start will not occur after expiration of the 30 minute blocking period, but will be delayed until actually required, as sensed by the applicable cycle mode temperature control algorithm.

When step 270 finds mode selector switch 174 in the cycle mode position, step 270 branches to step 298 in FIG. 3B. Step 298 compares signal FL with a predetermined value, such as 0.3. If the fuel level signal FL is between 0.3 and 0.4, no further modification to the operation of unit 20 is initiated, and step 298 proceeds to step 250.

When signal FL drops below a value of 0.3 step 300 determines if signal is above or below a value of 0.2. When step 300 finds signal FL between 0.2 and 0.3, step 300 proceeds to step 302 which determines if a flag NMF1 has been set. At this point in program 232 flag NMF1 will not be set, and step 304 initiates a first expansion in the limits of the NULL operating mode. Step 304 fetches null zone limits UNTL and LNTL from RAM 124 and modifies each value by a predetermined constant, such as 3. The upper zone limit UNTL is raised by 3 and the lower zone limit LNTL is lowered by 3. This changes the lower null zone temperature limit from LNTL to LNTL1, and it raises the upper null zone temperature limit from UNTL to UNTL1, as shown in FIG. 8. Step 306 then sets flag NMF1, which prevents this modification from being initiated upon subsequent runnings of program 232. Upon subsequent runnings of program 232, as long as signal FL is equal to, or above 0.2, step 302 will find flag NMF1 set and step 302 will advance to step 250.

When fuel consumption drops such that signal FL drops below 0.2, step 300 will branch to step 308. Step 308 checks a flag NMF2 to determine if the next fuel saving modification has been initiated. At this point in program 232 flag NMF2 will not be set, and step 308 proceeds to step 310 which further modifies the previously modified null zone limit values of UNTL and LNTL. The values of UNTL and LNTL stored in RAM 124 have already been modified by step 304, such as by a constant of 3, and step 310 further modifies the modified values by a predetermined constant, such as 3. Thus, as indicated in FIG. 8, the lower null zone limit will be reduced from LNTL1 to LNTL2, and the upper null zone limit will be increased from UNTL1 to UNTL2. Step 312 sets flag NMF2, to indicate to step 308 during subsequent runnings of program 232 that this modification to the null zone has been made, and step 312 advances to step 314. Step 308 also advances to step 314 when flag NMF2 is found to be set.

Step 314 determines if signal FL is above or below a predetermined value, such a 0.1. When signal F1 is equal to, or greater than 0.1, step 314 proceeds to step 250. When fuel level signal FL is found to be below 0.1, step 316 sets the hereinbefore described flag RNF, which imposes the hereinbefore described maximum engine running time of 15 minutes, for example, after a re-start, and the minimum engine off time of 30 minutes, for example, after an engine stop. Step 316 then proceeds to step 250.

What is claimed is:

1. A method of operating a transport refrigeration unit associated with a conditioned space to be temperature controlled, with the transport refrigeration unit including a refrigerant compressor driven by an internal combustion engine having fuel in a fuel supply tank, comprising the steps of:

providing a fuel level signal responsive to the amount of fuel in the fuel supply tank, and modifying the operation of the transport refrigeration unit in response to a predetermined value of the fuel level signal, said modifying step increasing the length of time the transport refrigeration unit will function to control the temperature of the conditioned space without exhausting the fuel in the fuel supply tank.

2. The method of claim 1 including the step of providing an alarm when the operation of the transport refrigeration unit is modified in response to the predetermined value of the fuel level signal.

3. The method of claim 1 including the step of maintaining a fuel history, said step of maintaining a fuel history including the steps of:

recording the value of the fuel level signal at predetermined increments thereof, and time stamping each recording of the fuel level signal.

4. The method of claim 1 including the step of operating the internal combustion engine at a selected one of predetermined upper and lower speeds in response to a predetermined temperature control algorithm, with the step of modifying the operation of the transport refrigeration unit at a predetermined value of the fuel level signal including the step of blocking operation of the internal combustion engine at the predetermined upper speed.

5. The method of claim 1 including the steps of:

operating the internal combustion engine at a selected one of predetermined upper and lower speeds in response to a predetermined temperature control algorithm, and operating the transport refrigeration unit in a selected one of first and second operating modes, with the first operating mode being a continuous mode and the second operating mode being a start-stop cycle mode, with the step of modifying the operation of the transport refrigeration unit at a predetermined value of the fuel level signal including the step of blocking operation of the internal combustion engine at the predetermined upper speed, regardless of which of the first and second operating modes has been selected.

6. The method of claim 1 including the steps of:

operating the internal combustion engine at a selected one of predetermined upper and lower speeds in response to a predetermined temperature control algorithm, operating the transport refrigeration in a selected one of first and second operating modes, with the first operating mode being a continuous mode and the second operating mode being a start-stop cycle mode, and operating the transport refrigeration unit with suction line modulation in response to the temperature control algorithm, with the step of modifying the operation of the transport refrigeration unit including the steps of:

blocking operation of the internal combustion engine at the predetermined upper speed, at a first predetermined value of the fuel level signal, regardless of which of the first and second operating modes has been selected, and forcing the transport refrigeration unit to operate with a predetermined degree of suction line modulation in response to a second predetermined value of the fuel level signal, when the first operating mode has been selected, with the second predetermined value of the fuel level signal being less than the first predetermined value.

7. The method of claim 1 including the steps of:

operating the internal combustion engine at a selected one of predetermined upper and lower speeds in response to a predetermined temperature control algorithm, operating the transport refrigeration unit in a selected one of first and second operating modes, with the first operating mode being a continuous mode and the second operating mode being a start-stop cycle mode, and operating the transport refrigeration unit with suction line modulation in response to the temperature control algorithm, with the step of modifying the operation of the transport refrigeration unit including the steps of:

blocking operation of the internal combustion engine at the predetermined upper speed, at a first predetermined value of the fuel level signal, regardless of which of the first and second operating modes has been selected, forcing the transport refrigeration unit to operate with a predetermined first degree of suction line modulation in response to a second predetermined value of the fuel level signal, when the first operating mode has been selected, with the second predetermined value of the fuel level signal being less than the first predetermined value, and forcing the transport refrigeration unit to operate with a predetermined second degree of suction line modulation in response to a third predetermined value of the fuel level signal, when the first operating mode has been selected, with the third predetermined value of the fuel level signal being less than the second predetermined value, and with the second degree of suction line modulation being greater than the first degree of suction line modulation.

8. The method of claim 1 including the steps of:

operating the internal combustion engine at a selected one of predetermined upper and lower speeds in response to a predetermined temperature control algorithm, and operating the transport refrigeration unit in a selected one of first and second operating modes, with the first operating mode being a continuous mode and the second operating mode being a start-stop cycle mode, with the step of modifying the operation of the transport refrigeration unit including the steps of:

blocking operation of the internal combustion engine at the predetermined upper speed, at a first predetermined value of the fuel level signal, regardless of which of the first and second operating modes has been selected, and forcing the transport refrigeration unit to operate in the second operating mode in response to a second predetermined value of the fuel level signal, when the first operating mode has been selected, with the second predetermined value of the fuel level signal being less than the first predetermined value.

9. The method of claim 8 including the steps of:

operating the transport refrigeration unit with a first null temperature zone when the second operating mode has been selected, and operating the transport refrigeration unit with a second null temperature zone when the second operating mode has been forced by the forcing step, with the second null temperature zone being larger than the first null temperature zone.

10. The method of claim 8 including the steps of:

providing a run time limit in response to the step of forcing the transport refrigeration unit to operate in the second operating mode, said run time limit providing a maximum running time for the internal combustion engine after each start thereof, and providing a null time limit in response to the step of forcing the transport refrigeration unit to operate in the second operating mode, said null time limit providing a minimum off time for the internal combustion engine after each stop thereof.

11. The method of claim 1 including the steps of:

operating the internal combustion engine at a selected one of predetermined upper and lower speeds in response to a predetermined temperature control algorithm, operating the transport refrigeration unit in a selected one of first and second operating modes, with the first operating mode being a continuous mode and the second operating mode being a start-stop cycle mode, and operating the transport refrigeration unit with suction line modulation in response to the temperature control algorithm, with the step of modifying the operation of the transport refrigeration unit including the steps of:

blocking operation of the internal combustion engine at the predetermined upper speed, at a first predetermined value of the fuel level signal, regardless of which of the first and second operating modes has been selected, forcing the transport refrigeration unit to operate with a predetermined first degree of suction line modulation in response to a second predetermined value of the fuel level signal, when the first operating mode has been selected, with the second predetermined value of the fuel level signal being less than the first predetermined value, forcing the transport refrigeration unit to operate with a predetermined second degree of suction line modulation in response to a third predetermined value of the fuel level signal, when the first operating mode has been selected, with the third predetermined value of the fuel level signal being less than the second predetermined value, and with the second degree of suction line modulation being greater than the first degree of suction line modulation, and forcing the transport refrigeration unit to operate in the second operating mode in response to a fourth predetermined value of the fuel level signal, when the first operating mode has been selected, with the fourth predetermined value of the fuel level signal being less than the third predetermined value.

12. The method of claim 11 including the steps of:

operating the transport refrigeration unit with a first null temperature zone when the second operating mode has been selected, and operating the transport refrigeration unit with a second null temperature zone when the second operating mode has been forced by the forcing step, with the second null temperature zone being larger than the first null temperature zone.

13. The method of claim 11 including the steps of:

providing a run time limit in response to the step of forcing the transport refrigeration unit to operate in the second operating mode, said run time limit providing a maximum running time for the internal combustion engine after each start thereof, and providing a null time limit in response to the step of forcing the transport refrigeration unit to operate in the second operating mode, said null time limit providing a minimum off time for the internal combustion engine after each stop thereof.

14. The method of claim 1 including the steps of:

operating the internal combustion engine at a selected one of predetermined upper and lower speeds in response to a predetermined temperature control algorithm, and operating the transport refrigeration unit in a selected one of first and second operating modes, with the first operating mode being a continuous mode and the second operating mode being a start-stop cycle mode, with the step of modifying the operation of the transport refrigeration unit including the steps of:

blocking operation of the internal combustion engine at the predetermined upper speed, at a first predetermined value of the fuel level signal, regardless of which of the first and second operating modes has been selected, operating the transport refrigeration unit with a first null temperature zone when the second operating mode has been selected, and operating the transport refrigeration unit with a second null temperature zone, when the second operating mode has been selected, in response to a second predetermined value of the fuel level signal, with the second predetermined value of the fuel level signal being less than the first predetermined value, and with the second null temperature zone being larger than the first null temperature zone.

15. The method of claim 1 including the steps of:

operating the internal combustion engine at a selected one of predetermined upper and lower speeds in response to a predetermined temperature control algorithm, and operating the transport refrigeration unit in a selected one of first and second operating modes, with the first operating mode being a continuous mode and the second operating mode being a start-stop cycle mode, with the step of modifying the operation of the transport refrigeration unit including the steps of:

blocking operation of the internal combustion engine at the predetermined upper speed, at a first predetermined value of the fuel level signal, regardless of which of the first and second operating modes has been selected, operating the transport refrigeration unit with a first null temperature zone when the second operating mode has been selected, operating the transport refrigeration unit with a second null temperature zone, when the second operating mode has been selected, in response to a second predetermined value of the fuel level signal, with the second predetermined value of the fuel level signal being less than the first predetermined value, and with the second null temperature zone being larger than the first null temperature zone, and operating the transport refrigeration unit with a third null temperature zone, when the second operating mode has been selected, in response to a third predetermined value of the fuel level signal, with the third predetermined value of the fuel level signal being less than the second predetermined value, and with the third null temperature zone being larger than the second null temperature zone.

16. The method of claim 15 including the steps of:

providing a run time limit in response to the third predetermined value of the fuel level signal, said run time limit providing a maximum running time for the internal combustion engine after each start thereof, and providing a null time limit in response to the third predetermined value of the fuel level signal, said null time limit providing a minimum off time for the internal combustion engine after each stop thereof.

17. A transport refrigeration unit associated with a conditioned space to be temperature controlled, with the transport refrigeration unit including a refrigerant compressor driven by an internal combustion engine having fuel in a fuel supply tank, comprising:

first means providing a fuel level signal responsive to the amount of fuel in the fuel supply tank, and second means modifying the operation of the transport refrigeration unit in response to a predetermined value of the fuel level signal provided by said first means, said second means increasing the length of time the transport refrigeration unit will function to control the temperature of the conditioned space without exhausting the fuel in the fuel supply tank.

18. The transport refrigerant unit of claim 17 including alarm means which provides an alarm when the operation of the transport refrigeration unit is modified by the second means.

19. The transport refrigeration unit of claim 17 including fuel history means for maintaining a fuel history, said fuel history means including:

recording means for recording the value of the fuel level signal at predetermined increments thereof, and means time stamping each recording of the fuel level signal by the recording means.

20. The transport refrigeration unit of claim 17 including:

temperature control algorithm means, and engine speed selector means operating the internal combustion engine at a selected one of predetermined upper and lower speeds in response to said temperature control algorithm means, with the means modifying the operation of the transport refrigeration unit at a predetermined value of the fuel level signal including means blocking operation of the internal combustion engine at the predetermined upper speed.

21. The transport refrigeration unit of claim 17 including:

temperature control algorithm means, means operating the internal combustion engine at a selected one of predetermined upper and lower speeds in response to said temperature control algorithm means, and operating mode selector means operating the transport refrigeration unit in a selected one of first and second operating modes, with the first operating mode being a continuous mode and the second operating mode being a start-stop cycle mode, with the means modifying the operation of the transport refrigeration unit at a predetermined value of the fuel level signal including means blocking the operation of the internal combustion engine at the predetermined upper speed, regardless of which operating mode has been selected by the operating mode selector means.

22. The transportation refrigeration unit of claim 17 including:

temperature control algorithm means, speed selector means operating the internal combustion engine at a selected one of predetermined upper and lower speeds in response to said temperature control algorithm means, operational mode selector means operating the transport refrigeration in a selected one of first and second operating modes, with the first operating mode being a continuous mode and the second operating mode being a start-stop cycle mode, suction line modulation means for operating the transport refrigeration unit with suction line modulation in response to the temperature control algorithm means, said means for modifying the operation of the transport refrigeration unit including means blocking operation of the internal combustion engine at the predetermined upper speed, at a first predetermined value of the fuel level signal, regardless of which operating mode has been selected by the operational mode selector means, and means forcing the transport refrigeration unit to operate with a predetermined degree of suction line modulation in response to a second predetermined value of the fuel level signal, when the first operating mode has been selected by the operational mode selector means, with the second predetermined value of the fuel level signal being less than the first predetermined value.

23. The transport refrigeration unit of claim 17 including:

temperature control algorithm means, means operating the internal combustion engine at a selected one of predetermined upper and lower speeds in response to said temperature control algorithm, operation mode selector means operating the transport refrigeration unit in a selected one of first and second operating modes, with the first operating mode being a continuous mode and the second operating mode being a start-stop cycle mode, suction line modulation means for operating the transport refrigeration with suction line modulation in response to the temperature control algorithm means, with the means for modifying the operation of the transport refrigeration unit including:

means blocking operation of the internal combustion engine at the predetermined upper speed, at a first predetermined value of the fuel level signal, regardless of which operating mode has been selected by the operational mode selector means, means forcing the suction line modulation means to operate the transport refrigeration unit with a predetermined first degree of suction line modulation in response to a second predetermined value of the fuel level signal, when the first operating mode has been selected by the operational mode selector means, with the second predetermined value of the fuel level signal being less than the first predetermined value, and means forcing the suction line modulation means to operate the transport refrigeration unit with a predetermined second degree of suction line modulation, which is higher than the predetermined first degree of suction line modulation, in response to a third predetermined value of the fuel level signal, when the first operating mode has been selected by the operational mode selector means, with the third predetermined value of the fuel level signal being less than the second predetermined value.

24. The transport refrigeration unit of claim 17 including:

temperature control algorithm means, means operating the internal combustion engine at a selected one of predetermined upper and lower speeds in response to said predetermined temperature control algorithm means, and operational mode selector means operating the transport refrigeration in a selected one of first and second operating modes, with the first operating mode being a continuous mode and the second operating mode being a start-stop cycle mode, with the means for modifying the operation of the transport refrigeration unit including:

means blocking the operation of the internal combustion engine at the predetermined upper speed, at a first predetermined value of the fuel level signal, regardless of which of the first and second operating modes has been selected by the operational mode selector means, and means forcing the transport refrigeration unit to operate in the second operating mode in response to second predetermined value of the fuel level signal, when the first operating mode has been selected by the operational mode selector means, with the second predetermined value of the fuel level signal being less than the first predetermined value.

25. The transport refrigeration unit of claim 24 including:

means operating the transport refrigeration unit with a first null temperature zone when the second operating mode has been selected by the operational mode selector means, and means operating the transport refrigeration unit with a second null temperature zone when the second operating mode has been forced by the forcing means, with the second null temperature zone being larger than the first null temperature zone.

26. The transport refrigeration unit of claim 24 including:

means providing a run time limit when the second operating mode has been forced by the forcing means, said run time limit providing a maximum running time for the internal combustion engine after each start thereof, and means providing a null time limit when the second operating mode has been forced by the forcing means, said null time limit providing a minimum off time for the internal combustion engine after each stop thereof.

27. The transport refrigeration unit of claim 17 including:

temperature control algorithm means, means operating the internal combustion engine at a selected one of predetermined upper and lower speeds in response to said predetermined temperature control algorithm means, operational mode selector means operating the transport refrigeration unit in a selected one of first and second operating modes, with the first operating mode being a continuous mode and the second operating mode being a start-stop cycle mode, and suction line modulation means for operating the transport refrigeration with suction line modulation in response to the temperature control algorithm means, with the means for modifying the operation of the transport refrigeration unit including:

means blocking operation of the internal combustion engine at the predetermined upper speed, at a first predetermined value of the fuel level signal, regardless of which operating mode has been selected by the operational mode selector means, means forcing the suction line modulation means to operate the transport refrigeration unit with a predetermined first degree of suction line modulation in response to a second predetermined value of the fuel level signal, when the first operating mode has been selected by the operational mode selector means, with the second predetermined value of the fuel level signal being less than the first predetermined value, means forcing the suction line modulation means to operate the transport refrigeration unit with a predetermined second degree of suction line modulation, which is higher than the predetermined first degree of suction line modulation, in response to a third predetermined value of the fuel level signal, when the first operating mode has been selected by the operational mode selector means, with the third predetermined value of the fuel level signal being less than the second predetermined value, and means forcing the transport refrigeration unit to operate in the second operating mode in response to a fourth predetermined value of the fuel level signal, when the first operating mode has been selected by the operational mode selector means, with the fourth predetermined value of the fuel level signal being less than the third predetermined value.

28. The transport refrigeration unit of claim 27 including:

means operating the transport refrigeration unit with a first null temperature zone when the second operating mode has been selected by the operational mode selector means, and means operating the transport refrigeration unit with a second null temperature zone when the second operating mode has been forced by the forcing means, with the second null temperature zone being larger than the first null temperature zone.

29. The transport refrigeration unit of claim 27 including:

means providing a run time limit when the second operating mode has been forced by the forcing means, said run time limit providing a maximum running time for the internal combustion engine after each start thereof, and means providing a null time limit when the second operating mode has been forced by the forcing means, said null time limit providing a minimum off time for the internal combustion engine after each stop thereof.

30. The transport refrigeration unit of claim 17 including:

temperature control algorithm means, means operating the internal combustion engine at a selected one of predetermined upper and lower speeds in response to said temperature control algorithm means, and operational mode selector means operating the transport refrigeration unit in a selected one of first and second operating modes, with the first operating mode being a continuous mode and the second operating mode being a start-stop cycle mode, with the means for modifying the operation of the transport refrigeration unit including:

means blocking operation of the internal combustion engine at the predetermined upper speed in response to a first predetermined value of the fuel level signal, regardless of which operating mode has been selected by the operational mode selector means, means operating the transport refrigeration unit with a first null temperature zone when the second operating mode has been selected by the operational mode selector means, and means operating the transport refrigeration unit with a second null temperature zone when the second operating mode has been selected by the operational mode selector means, in response to a second predetermined value of the fuel level signal, with the second predetermined value of the fuel level signal being less than the first predetermined value, and with the second null temperature zone being larger than the first null temperature zone.

31. The transport refrigeration unit of claim 17 including:

temperature control algorithm means, means operating the internal combustion engine at a selected one of predetermined upper and lower speeds in response to said predetermined temperature control algorithm means, and operational mode selector means operating the transport refrigeration in a selected one of first and second operating modes, with the first operating mode being a continuous mode and the second operating mode being a start-stop cycle mode, with the means for modifying the operation of the transport refrigeration unit including:

means blocking operation of the internal combustion engine at the predetermined upper speed, at a first predetermined value of the fuel level signal, regardless of which operating mode has been selected by the operational mode selector means, means operating the transport refrigeration unit with a first null temperature zone when the second operating mode has been selected by the operational mode selector means, means operating the transport refrigeration unit with a second null temperature zone, when the second operating mode has been selected by the operational mode selector means, in response to a second predetermined value of the fuel level signal, with the second predetermined value of the fuel level signal being less than the first predetermined value, and with the second null temperature zone being larger than the first null temperature zone, and means operating the transport refrigeration unit with a third null temperature zone, when the second operating mode has been selected by the operational mode selector means, in response to a third predetermined value of the fuel level signal, with the third predetermined value of the fuel level signal being less than the second predetermined value, and with the third null temperature zone being larger than the second null temperature zone.

32. The transport refrigeration unit of claim 31 including:

means providing a run time limit in response to the third predetermined value of the fuel level signal, third predetermined value of the fuel level signal, said run time limit providing a maximum running time for the internal combustion engine after each start thereof, and means providing a null time limit in response to the third predetermined value of the fuel level signal, said null time limit providing a minimum off time for the internal combustion engine after each stop thereof.

* * * * *